United States Patent [19]

Nordstrom

[11] Patent Number: 5,131,606
[45] Date of Patent: Jul. 21, 1992

[54] SEAT PALLET AND CARGO PALLET RESTRAINING SYSTEM

[76] Inventor: Arnold Nordstrom, 1340 Farrand Rd., Fallbrook, Calif. 92028

[21] Appl. No.: 678,455

[22] Filed: Apr. 1, 1991

[51] Int. Cl.⁵ .................................................. B64C 1/20
[52] U.S. Cl. ................................. 244/118.1; 244/137.1
[58] Field of Search ............... 244/118.1, 118.6, 137.1, 244/137.3, 118.2, 118.5; 410/69, 78, 79, 92

[56] References Cited

U.S. PATENT DOCUMENTS

| | | | |
|---|---|---|---|
| 3,377,040 | 4/1968 | Hansen | 410/79 |
| 3,381,921 | 5/1968 | McDonough et al. | 244/137.1 |
| 3,986,460 | 10/1976 | Voigt et al. | 244/137.1 |
| 4,089,275 | 5/1978 | Pelletier | 410/79 |
| 4,415,298 | 11/1983 | Voigt | 410/69 |

FOREIGN PATENT DOCUMENTS 2335676  7/1977  France ..................... 410/79

*Primary Examiner*—Joseph F. Peters, Jr.
*Assistant Examiner*—Anne E. Bidwell
*Attorney, Agent, or Firm*—Calif Tervo

[57] ABSTRACT

The invention generally comprises a rail assembly attached to an airplane floor structure and a latch assembly in a seat pallet. The rail assembly generally includes a rail attached to a floor channel, and rollers and cargo restraining assemblies attached to the rail. The top of the rail has left and right facing teeth for engaging a seat pallet latch. Rollers connected to the rail define a roller plane above the rail for rollingly supporting a pallet. A seat pallet is supported by the rollers and includes a latch assembly for selectively engaging the rail teeth and thus restraining the seat pallet from movement relative to the rail. The cargo pallet restraining assemblies include a plurality of pairs of housings connected to opposite sides of the rail. The housings include fore and aft facing lock heads movable between a stowed position beneath the roller plane and an erect position wherein a lip portion of the lock heads extends above the roller plane for restraining cargo pallets fore and aft on said roller plane. Preferably, the fore and aft lock heads in each housing are linked such that movement of either lock head to the erected or stowed position simultaneously moves the other lock head to the similar position.

22 Claims, 5 Drawing Sheets

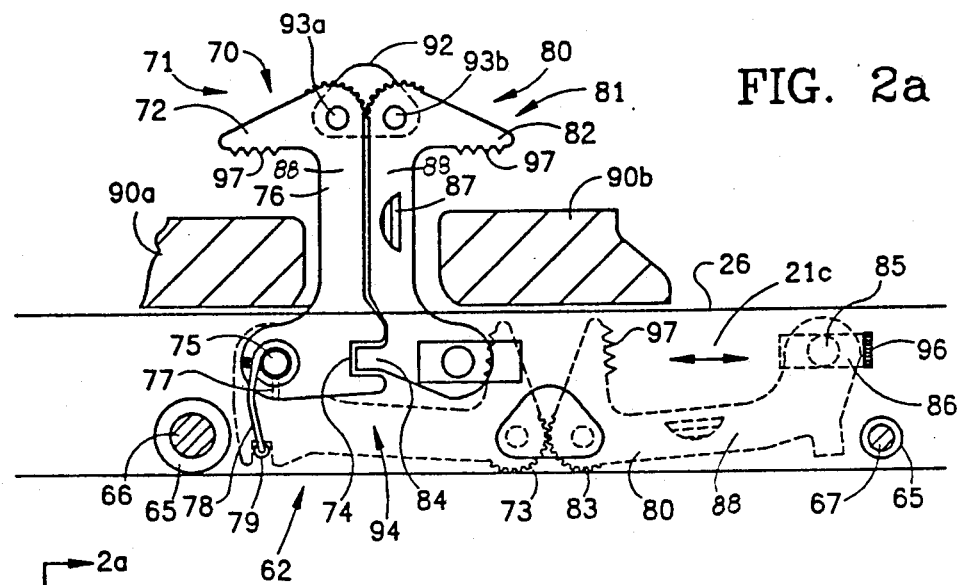
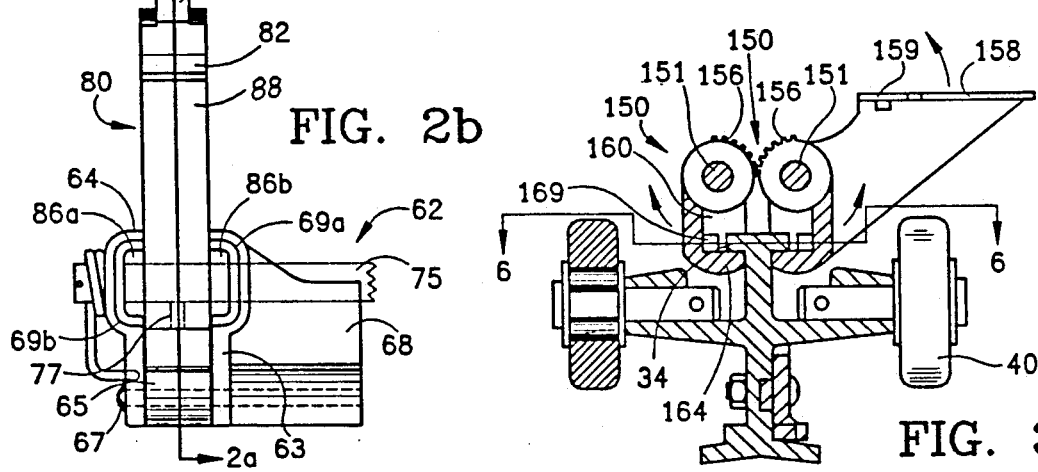
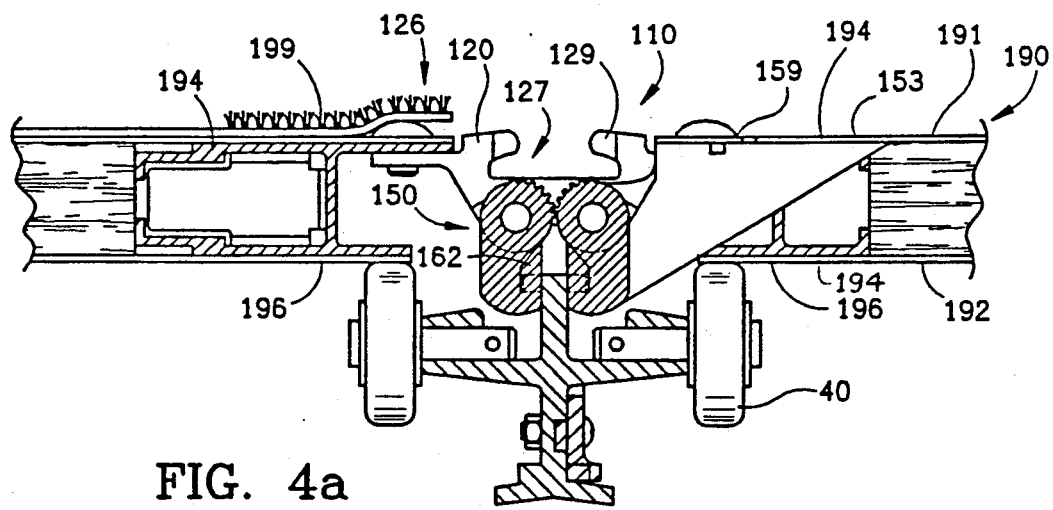

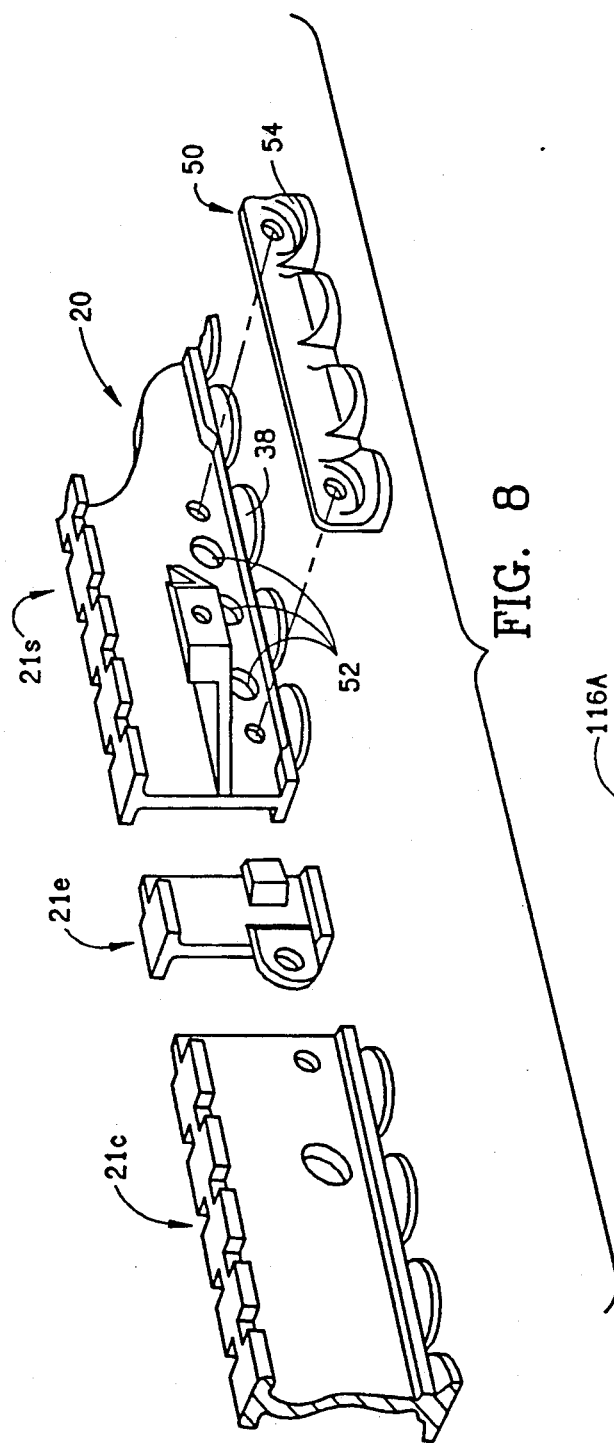
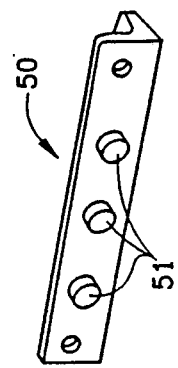
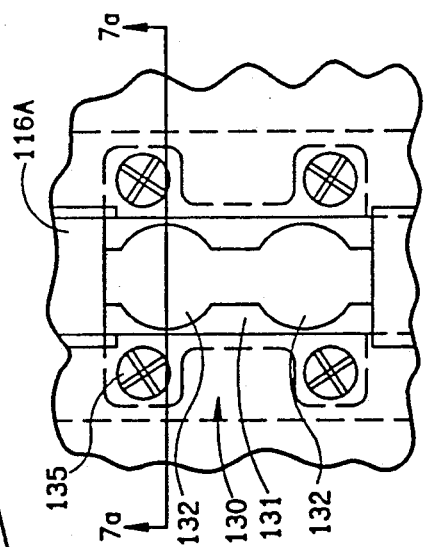

SEAT PALLET AND CARGO PALLET RESTRAINING SYSTEM

BACKGROUND OF THE INVENTION

1. Field of the Invention

This invention relates in general to a system apparatus for restraining both seat and cargo pallets in an airplane and more specifically includes a floor mounted rail with attached pallet rollers and cargo lock assemblies and includes a compact seat pallet latch for engaging the rail.

2. Background of the Invention

An airplane may be used to haul people in the daytime and freight at night. Typically, to make this conversion, the seat pallets are removed and cargo pallets are inserted. Typically, also, an aircraft structural floor includes spaced longitudinal structures, such as beam flanges or channels to which all restraining devices must be fastened.

Obviously, weight is an important consideration. Speed of conversion, versatility in handling various pallet sizes and types, and strength of the restraints are also important.

Conventional methods used to make this conversion have several drawbacks. Some are more heavy than desirable. Seat pallets and cargo pallets are of differing sizes, and no current pallet restraining system easily handles the varying sizes. Damaged components are not easy to replace.

Therefore, it is desirable to have a seat and cargo pallet restraining system that is lightweight, strong, and easily inserted into a vehicle and that accommodates various size seat and cargo pallets.

It is further desirable that such a system be extremely fast and easy to use in the conversion between seat and cargo pallets.

SUMMARY OF THE INVENTION

This invention is a cargo pallet and seat pallet restraining system for use with a moving vehicle, such as an airplane. The pallet restraining system generally comprises a rail assembly attached to the airplane structure and a latch assembly in a seat pallet.

The rail assembly generally includes a rail connected to the vehicle floor structure, and rollers and cargo restraining assemblies attached to the rail. Preferably, the floor structure includes an elongate floor channel of the type having a plurality of axial spaced lips which periodically narrow the channel, and the rail bottom includes buttons for placement in the channel. A retainer selectively prevents the rail from axial movement in the channel. The top of the rail has left and right facing teeth for engaging a seat pallet latch.

Rollers connected to the rail define a roller plane above the rail for rollingly supporting a pallet.

A seat pallet includes a bottom side supported by the rollers and a latch assembly selectively movable from a stowed position to an engaged position wherein it engages the rail teeth and restrains the seat pallet from movement relative to the rail. In the preferred embodiment, the latch assembly includes a pair of rotatable jaws that, in the stowed position are within the pallet and above the roller plane. The cargo pallet restraining assemblies include a plurality of housings connected to opposite sides of the rail. The housings include fore and aft facing lock heads movable between a stowed position beneath the roller plane and an erect position wherein a lip portion of the lock heads extends above the roller plane for restraining a cargo pallets fore and aft on said roller plane. Preferably, the fore and aft lock heads in each housing are linked such that movement of either lock head to the erected or stowed position simultaneously moves said other lock head to the similar position.

The rail may be comprised of a plurality of rail segments. A spacer segment between and connected to two rail segments and not attached to the channel can be removed to permit axial movement of adjacent rail segment and their removal from the channel for repair or replacement.

A rail retainer for retaining the rail in the channel includes partial-buttons for insertion into the channel and retained at lip level between adjacent axial lips such that the lips prevent axial movement of partial buttons and therefore prevent movement or removal of the rail.

The invention provides an extremely light weight and versatile pallet restraining system. Because the rollers and cargo pallet restraints are attached to the rail, all forces are passed through the rail to the floor channel. Seat pallets can be attached anywhere along the rail. Seat pallets may be quickly exchanged with cargo pallet and vice versa. Damaged sections can be replaced without removal of the entire rail assembly.

Other features and many attendant advantages of the invention will become more apparent upon a reading of the following detailed description together with the drawings, in which like reference numerals refer to like parts throughout.

BRIEF DESCRIPTION OF THE DRAWING

FIG. 2a is a side elevation view of cargo pallet lock housing and heads showing the lock heads in the erect position and in phantom lines in the stowed position.

FIG. 2b is a right end view of the cargo pallet lock housing and heads of FIG. 2a.

FIG. 3 is a partial sectional view of the seat pallet rail and seat pallet latch jaws in the engaged position taken on line FIG. 4a is a sectional view taken on line 4a—4a of FIG. 4c and further illustrating the seat pallet latch jaw structure in the rail engaging position and the seat pallet latch assembly as mounted in the seat pallet.

FIG. 7b is a top view of the fore seat leg receptacle of FIG. 7a.

FIG. 8 is a perspective view of a preferred embodiment of the seat rail including a rail retainer and a spacer segment.

FIG. 9 is a perspective view of the back side of the rail retainer of FIG. 8.

DETAILED DESCRIPTION OF THE INVENTION

Figure 1:
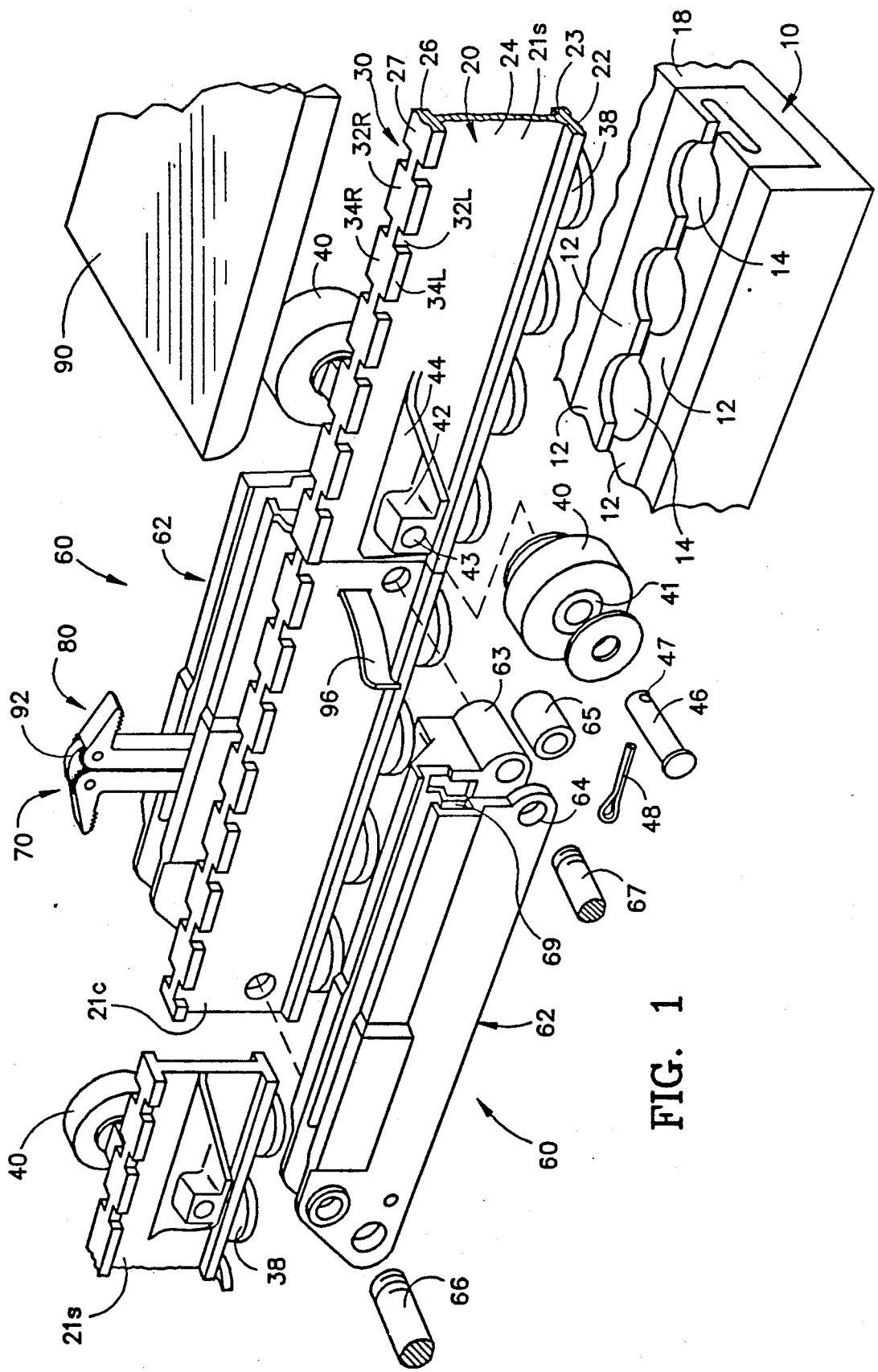
FIG. 1 is a perspective view of the major elements of a preferred embodiment the seat pallet and and cargo pallet restraining system of the present invention.

With reference now to the drawings, and more particularly to FIG. 1 thereof, there is shown in perspective view the major components of a preferred embodiment of the seat pallet and cargo pallet restraining system of the present invention.

Strength, security and safety are at a premium in such a system. Therefore, the elements described herein are typically made of high strength metal, such as steel or aluminum, unless otherwise noted.

A plurality of elongate floor channels, denoted generally as 10, are incorporated into the floor structure of the airplane. Typically, floor channel 10 is incorporated into the structural floor 18 of the airplane with the floor channel long axis running fore and aft. Floor channel 10 includes a plurality of axially spaced lip means, such as lips 12, for periodically narrowing the opening of floor channel 10, the purpose of which will be explained shortly. Floor channel access openings 14 are axially spaced between adjacent lips 12. Access openings 14 are three quarters of an inch in diameter and spaced every inch. Floor channels 10 are spaced typically twenty inches apart and parallel one another the length of the floor of the airplane compartment.

A seat pallet lock rail, denoted generally as 20, runs the length of the compartment. Rail 20 shown is an I-beam in cross section. Rail 20 is typically made of extruded aluminum.

Rail 20 has a bottom flange 23 having a bottom side 22, a central web 24, and a top T-flange 26 having a top side 27. In the preferred embodiment, rail 20 has a height of 1.150 inches; bottom and top flanges 23, 26 are 0.400 inches wide; and webbing is 0.150 inches wide.

Rail 20 includes a rail interlock means, denoted generally as 30, for engagement with a seat pallet latch assembly (described later). In the preferred embodiment shown, top flange 26 is modified to perform the rail interlock means 30 function. Top flange 26 is notched so as to in effect have notches 32 and teeth 34 and includes right engaging means, such as right facing notches and teeth 32R, 34R and left engaging means, such as left facing notches and teeth 32L, 34L. Notches 32 are three sixteenths inches wide and on half inch centers and teeth 34 are five sixteenths inches wide. In this manner the rail interlock means 30 is continuous over the length of rail 20.

Rail 20 is retained in floor channel 10 as follows. Attached to the bottom 22 of rail 20 is a plurality of button means, such as buttons 38, spaced corresponding to the spacing of floor channel access openings 14. Buttons 38 may be machined from an original rail extrusion. Buttons 38 are placed through access openings 14 and into floor channel 10. Then, by moving rail 20 axially one-half inch, rail buttons 38 are vertically entrapped by channel lips 12. A rail retainer (described later) is attached to prevent rail 20 from further axial movement. In this manner, rail 20 is locked in place in floor channel 10.

Rail 20 is made up of a plurality of adjoining rail segments 21. Illustrated is a cargo lock rail section 21c disposed between standard rail segments 21s. Standard segments 21s are typically six feet in length. Cargo lock section rail 21c is typically about seven inches in length and has a pair of cargo pallet restraining means, each denoted generally as 60, attached to it.

Pallet roller means, such as rollers 40, are located on rail 21, at approximately six to eight inch intervals. Preferably, a pair of rollers 40 are mounted on either side of each standard rail segment 21s. As seen in perspective view in FIG. 1 and in end view in FIGS. 3 and 4a, a roller mounting lug 42 containing roller bushing 43 is mounted on a roller standoff 44 attached to rail web 24. Roller 40 includes internal bearing 41 and is attached to lug 42 by suitable mounting hardware including washers (not numbered), axle pin 46 having a retainer bore 47, and retainer pin 48 for insertion in retainer bore 47. Rollers 40 are one inch in diameter.

Rollers 40 are mounted such that the top of the rollers define a roller plane for rollingly supporting pallets, such as cargo pallet 90 shown in FIG. 1 or seat pallet 190 as shown in FIG. 4a. As best seen in FIG. 4a, rail 20 is under the roller plane.

The cargo pallet restraining portion of the system is illustrated in FIGS. 1, 2a and 2b and will now be described in detail. A pair of cargo pallet restraining assemblies 60 are attached to each side of cargo rail segment 21c. Each includes a housing, denoted generally as 62. Each pair of housings 62 are fastened to rail 21c and to each other by fore and aft through bolts 66, 67 which pass through bores in the housing and rail as illustrated. Housing 62 includes an inner housing 63 and an outer housing 64 separated by a pair of spacers 65 (fore spacer not seen) placed over through bolts 66,67. Housing 62 is made of suitable strength material, such as of stainless steel investment casting.

As best seen in FIG. 2b, inner housing 63 is mounted off of rail 21c by standoffs or extension blades 68 through which through bolts 66,67 pass. A channel means, denoted generally as 69, is formed by a pair of channels, such as inner channel 69a in inner housing 63 and outer channel 69b in outer housing 64.

A pair of cargo pallet lock heads, fore lock head 70 and aft lock head 80, are located in housing 62 between inner housing 63 and outer housing 64. FIG. 1 shows a pair of lock heads 70,80 in the erect position. FIG. 2b is right end view of housing 62. FIG. 2a is a sectional side view of housing 62 taken on line 2a–2a of FIG. 2b and also showing lock heads 70,80 in phantom in the stowed position within housing 62. Lock head 70,80 are 0.375 inches thick and approximately 2.375 in height, but can be enlarged for larger cargo systems.

Fore lock head 70 has a top end 71 including a lip means, such as lip 72, for extending over a portion of a fore cargo pallet 90a on the roller plane, and a bottom end including pivoting and securing means, such as torque tie shaft 75 that pivotally connects head 70 to housing 62. A rigid post or body 76 supports fore lock head top end 71. Set screw 77 fastens fore lock head 70 to torque tie shaft 75 so that shaft 75 rotates with the head 70.

Torque tie shaft 75 is journaled in through bores in housing 62 such that head 70 can rotate about shaft 75 between a stowed and an erect position. In the stowed position shown in phantom, lock head 70 is within housing 62. Erection biasing spring 78 has an anchor end 79 connected to housing 62 and an inner end connected to lock head 70 such that upon rotation of shaft 75 erection spring 78 is biased toward moving lock head 70 toward the erect position and holds heads 70, 80 in the erect position absent other forces. Torque tie shaft 75 extends to the fore lock head on the other side of rail 21c so that erection of one pair of heads 70,80 erects the coupled pair on the other side of rail 21c.

Aft lock head 80 is quite similar to fore lock head 70 and includes a top end 81 including a lip means, such as lip 82, for extending over a portion of an aft cargo pallet 90b on the roller plane, and a bottom end including sliding and pivoting securing means including a pivot shaft 85 journaled in a pair of sliders 86a, 86b in housing channel 69a, 69b. Sliders 86a, 86b secure head 80 bottom end in housing channel 69 and allow movement between the erect and stowed positions. Head 80 is rotatable about pivot shaft 85. A rigid post or body 88 supports aft lock head top end 81.

A pivot tie link 92 pivotally connects the head tops 71, 81 together such that movement of either lock head 70,80 to the stowed or erected position simultaneously moves the other lock head to the similar position. Head tops 71,81 are radiused and tie link 92 is pivotally connected at the centers of radius by pins 93a,93b. Each head 70,80 includes a ninety degree gear 73,83 on its contact radius to aid in synchronous uniform movement of the heads 70,80.

An interlock means, denoted generally as 94, maintains the lock heads 70,80 in the erect position under load forces by pallets. The interlock means includes a projection 84 on the bottom end of head 80 that mates with a receiving slot 74 in the bottom end of head 70. Once the lockheads 70,80 are mated, pallet forces on the upper end of heads 70,80 can no longer cause their collapse to the stowed position.

Cargo lock heads 70,80 are shown in phantom in the stowed position. Heads 70,80 are stowed by moving the bottom end of aft head 80 aft to disengage projection 84 from slot 74, thereby allowing rotation of fore head 70. Aft head 80 includes grip ridges 87 on body 88 for grabbing by hand and pulling aft for separating the interlock 94.

Spring 96 acts as a biasing means for maintaining the heads in the stowed position when in the stowed position and as a transitory aid in erection. As best seen in FIG. 1, spring 96 is anchored to rail 21c and passes through an aperture in housing 62 and terminates in channel 69. Slider 86, in moving to the fully stowed position, bears against spring 96 and loads it. The spring force on slider 86 is directed along channel 69 which is over-center from pivot tie pins 93a, 93b in the stowed position, thereby holding the heads stowed. The heads 70,80 are erected by slight upward force on a head upper end, such as by a finger on lip teeth 97, sufficient to pull the tie link pins 93a,93b above channel 69. Once this point is passed, spring 96 provides high initial impetus for popping heads 70,80 to the erect position.

Figure 4B:
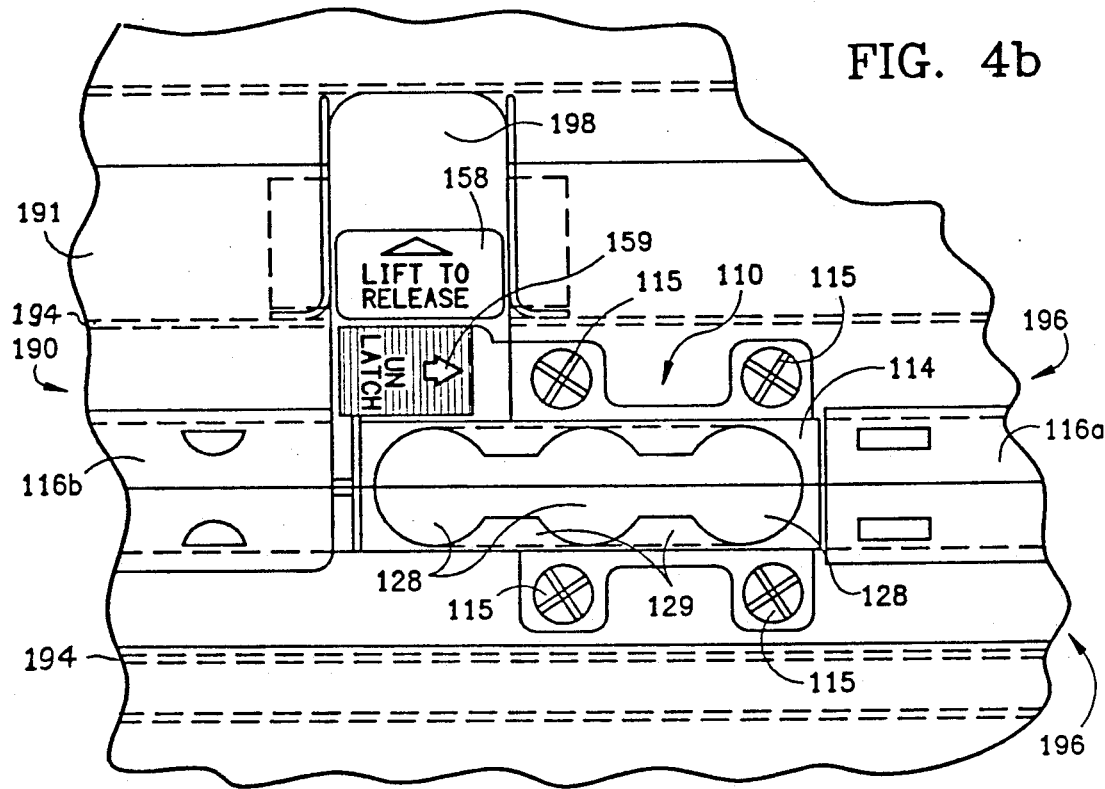
FIG. 4b is top view, cut away, of the seat pallet illustrating the seat pallet latch assembly and seat aft leg mount.
Figure 4C:
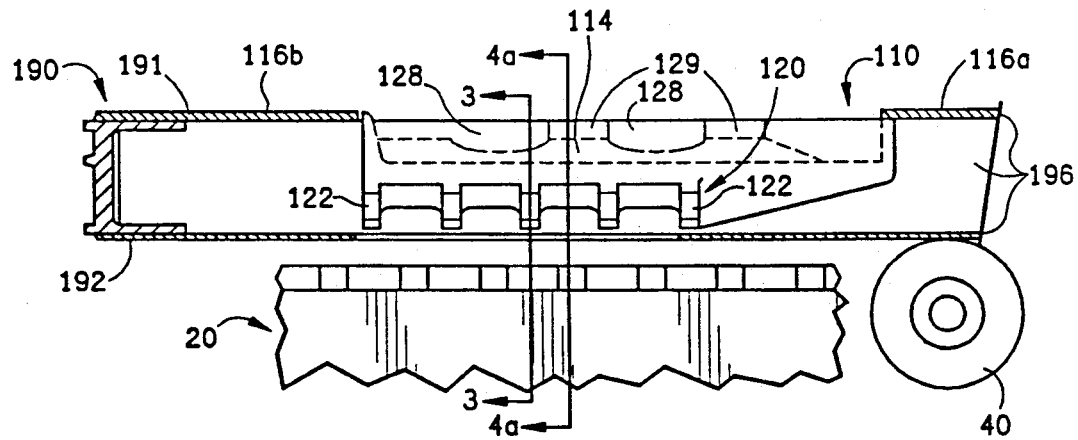
FIG. 4c is a side view of the seat pallet, seat aft leg receptacle, and latch mount of FIG. 4b and further including a roller and partial rail segment. The latch jaws are omitted for clarity.

A preferred embodiment of the seat pallet restraining portion of the system is illustrated in FIGS. 1, 3, 4a-c, 5, 6, and 7a-b. With reference first to FIGS. 4a-c, a seat pallet, denoted generally as 190, has a a bottom side 192 supported on the roller plane by roller 40 such that seat pallet 190 may freely roll above rail 20. Seat pallet 190 typically has a balsa wood core surrounded by upper and lower surfaces of aluminum sheeting and a peripheral rail, such as of extruded metal channel.

In FIG. 4a, left side, a mat or floor rug 199 is shown placed atop seat pallet top side 191. Traversing the length of seat pallet 190 is a metal shear channel 194 that houses and supports the seat pallet latch assemblies 110. Shear channel 194, as seen in cross-section in FIG. 4a, includes metal extrusion channels 196 for riding on rollers 40 and for supporting seat pallet 190 on the roller plane.

The seat pallet latch assembly, denoted generally as 110, is shown in various views in FIGS. 3-6 as mounted in an aperture in shear channel 194 of seat pallet 190. Latch assembly 110 has a rail-engaging position wherein it selectively engages with the notches and teeth 32,34 of rail of rail to flange 26 for restraining seat pallet 190 from movement relative to rail 20, and has a stowed or non-engaging position wherein it is entirely above the roller plane such that a seat pallet 190 can be freely moved on the roller plane without latch assembly 110 hitting rail 20.

Seat pallet latch assembly 110 generally includes rail engaging means, such as a pair of hinged jaws 150, and a casing 114 including mounting means, such as bearings, denoted generally as 120, for retaining jaws 150. A full jaw 150 is best seen in perspective view in FIG. 5. Bearings 120 are best seen in longitudinal cross-section in FIG. 4c.

FIG. 4c is a cross-section view taken longitudinally down the middle of shear channel 194 and latch assembly casing 114. Jaws 150 are not shown for clarity. Seat pallet 190 is shown supported over rail 20 by roller 40. FIG. 4b is a top view of of the latch assembly of FIG. 4c showing the latch assembly 110 as it appears looking down at the top side 191 of pallet 190.

With reference once more to FIG. 4c, casing 114 includes on its under side two rows of bearings 120, each row for supporting a rail engaging jaw 150. The top side of casing 114 includes means for attaching a seat aft leg to the casing including leg receptacle, denoted generally as 126. Preferably, leg receptacle 126 functions similarly to the floor channel 10 described earlier, in that a channel, denoted generally as 127 (best seen in FIG. 4a ) includes access openings 128 spaced between adjacent lips 129 for receiving and retaining buttons on the end of the seat leg. In this manner, the seat leg forces are transmitted through casing 114 to jaws 150 and to rail 20 and the floor structure.

Looking at the latch assembly 110 from the top in FIG. 4b, casing 114 is attached to shear channel extrusion channels 196 with bolts 115. Cover plates 116a,116b cover the top opening to shear channel 194 fore and aft of latch assembly 110. Cover plates 116 are attached to the extrusion channels 196. Activation lever 158 is part of a jaw 150 and its outer end is lifted to rotate jaws 150 thereby disengaging them from rail 20. Means, such as lock 159, locks activation lever 158 in the down or latched position. In the preferred embodiment, lock 159 is slideably attached to lever 158 in such a manner that a portion of it can be selectively slid into a cavity in casing 114 whereby lever 158 cannot be lifted. Finger aperture 198 in seat pallet 190 extends under lever 158 and allows a user to insert a finger around and under lever 158 for lifting it to release the jaws.

Figure 5:
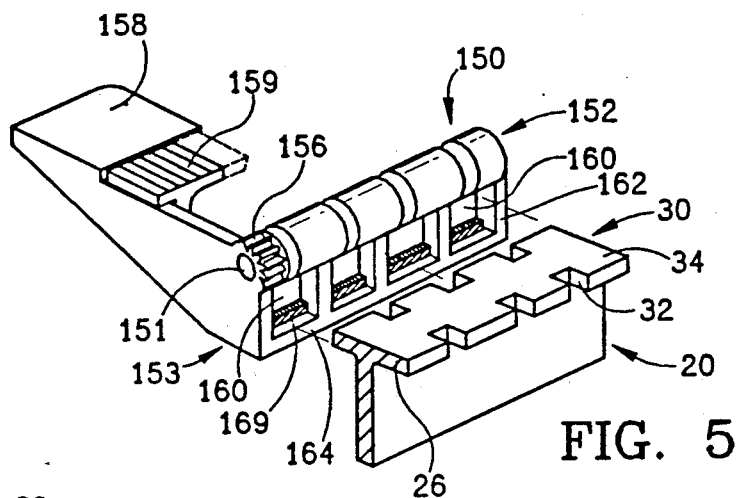
FIG. 5 is a perspective view of a seat latch jaw and activation lever.

FIG. 5 is a perspective view of a seat latch jaw 150 including activation lever 158 and lock 159. Lock 159 is shown in solid in the release position and in phantom moved to the lock position for engagement with a cavity in case 114. Jaw 150 is essentially a rail engaging device that is hingedly journaled to casing 114 for selectively engaging rail 20. Jaw 150 has an upper portion, denoted generally as 152, that is mounted on pintle 151 which in turn is mounted in bearings 122 such that jaw 150 can rotate relative to casing 114.

Jaw 150 includes a lower and rail engaging portion, denoted generally as 153, that includes rail engaging means, such as cavities 160, for engaging rail teeth 34 such that, in the locked position, jaw 150, and hence the seat pallet, cannot be moved horizontally away from or vertically upward relative to rail 20. Upon rotation of jaw 150 to the engaged position, vertical blades 162 fit snugly into rail notches 32 and horizontal bars 164 fit directly under teeth 34. Anti-rattle cushions 169 of shock absorbing material, such as neoprene, are attached by any suitable means to the interior of cavities 160 for preventing vibration and concomitant rattle noise.

Although only one jaw 150 of each pair is described in detail, it will be understood that a pair of jaws work in unison and a pair is needed to prevent horizontal movement away from rail 20. Although, only one of the jaws must have means, such as bar 164, extending under rail teeth 34 for preventing upward movement; in the preferred embodiment, for strength and symmetry, the rail engaging portion of both jaws are similar and include cavities including a bar for insertion under a rail tooth.

Ninety degree gear 156 engages a similar gear in the paired jaw, as best seen in FIG. 3, for simultaneously movement of paired jaws 150. Activation lever 158 has an inner end attached to jaw 150 and a free outer end. Raising and lowering the outer end rotates jaw 150 about pintle 151 thereby disengaging and engaging respectively the cavities 160 of paired jaws 150 with rail 20.

Figure 6:
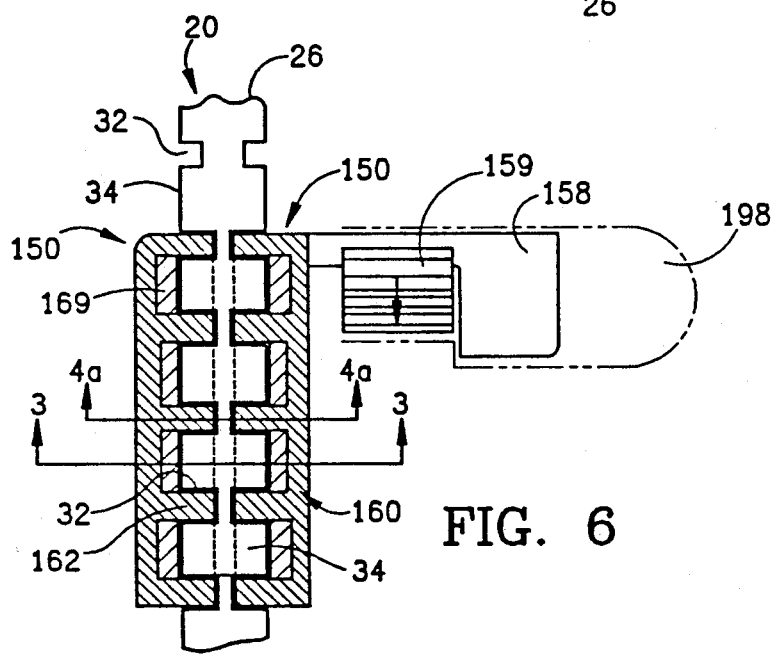
FIG. 6 is a top view at the level of the rail teeth depicting the seat latch jaws engaged with rail teeth.

FIG. 3 is a partial sectional view taken on line 3—3 of FIG. 6 through a cavity 160 of engaged jaws 150. This sectional position is also shown as line 3—3 of FIG. 4c with seat pallet 190 and casing 114 removed for clarity. Paired jaws 150 interlock with ninety degree gears 156. Rail tooth 34 protrudes into cavity 160 such that horizontal bars 164 lies under teeth 34 to prevent upward movement of jaws 150 and hence of seat pallet 190.

FIG. 4a is a sectional view take on line 4a—4a of FIG. 6 through blades of engaged jaws 150. This sectional view position is also shown by line 4a—4a in FIG. 4c with jaws 150 added. Blades 162 are shown inserted in the notches between teeth to prevent movement along rail 20.

Jaws 150 are moved to the stowed position by lifting activation lever 158. Lifting activation lever 158 rotates jaws 150 such that they are entirely above the roller plane. Thus, in the stowed position, none of the latch 110 interferes with movement of pallet 190 on the roller plane.

FIG. 6 is a partial sectional view taken on line 6—6 of FIG. 3 showing a horizontal view of engaged jaw cavities at the rail tooth level. Rail teeth 34 are encompassed by cavities 160. Blades 162 are engaged in rail notches 32.

Figure 7A:
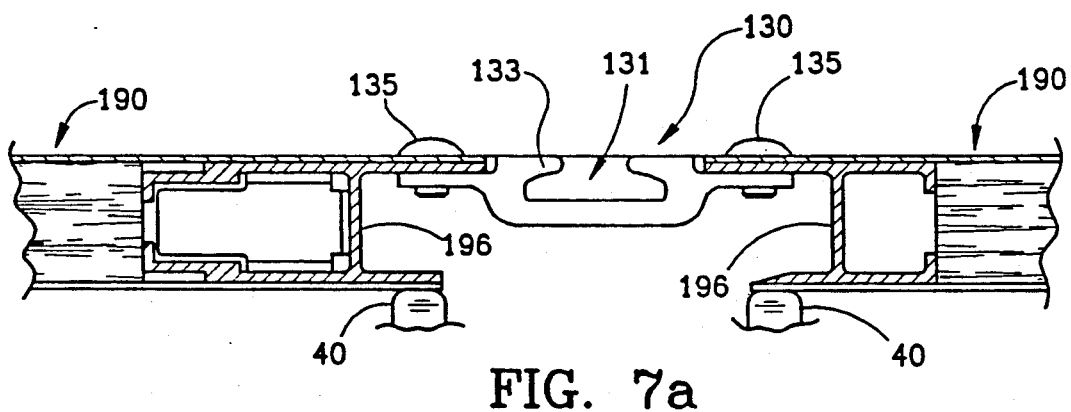
FIG. 7a is a sectional view of a seat pallet and fore seat leg receptacle.

FIG. 7a and FIG. 7b illustrate the seat fore leg receptacle, denoted generally as 130, as mounted in pallet shear channel 194. FIG. 7a is a cross-sectional view taken across shear channel 94 and shown by line 7a—7a of FIG. 7b. FIG. 7b is a top view of the fore leg receptacle 130 as seen from above seat pallet 190. Fore leg receptacle 130 is attached to shear channel 194 by suitable fasteners, such as bolts 135. Receptacle 130 functions similarly to that of aft leg receptacle 126 and includes a channel 131 having openings 132 thereto and restrictive lips 133. A button on the seat leg bottom is placed in opening 132 and move under lip 131 to prevent upward movement.

FIGS. 8 and 9 are perspective views further illustrating seat pallet rail 20 and preferred structures for retention of the rail in the floor channel. As review from FIG. 1, standard seat pallet rail section 21s includes buttons 38 on the bottom for insertion into the floor channel. Rail 21s is then moved one-half spacing fore or aft so that the buttons 38 are under channel lips thereby preventing vertical movement of rail 21s.

Rail retainer 50 prevents rail fore and aft movement. Rail retainer 50 is shown in front perspective in FIG. 8 and in rear perspective in FIG. 9. Rail retainer 50 is attached to rail 21s by suitable means, such as by bolts, not shown, and further strengthened against fore/aft movement by shear lugs 51 that engage bores 52 in rail 21s. Lock buttons 54 go into floor channel access openings 14 and abut lips 12 on the side thereby preventing fore/aft movement.

Emergency spacer rail section 21e is inserted preferably in rail 20 directly adjacent cargo lock head rail segment 21c for facilitating replacement of a cargo lock head rail section 21c and attached lock heads in case of a cargo lock head malfunction. Emergency spacer rail section 21e does not interact with the floor channel and it has no bottom button. Section 21e is attached to an adjacent rail section by any suitable means, such as by a bolt, not shown so that it can easily by unattached and removed. Section 21e is sufficiently wide fore/aft such that, upon removal, cargo head rail section 21c can be moved fore/aft for removal and replacement of the rail 21c and adjoining cargo lock heads.

From the foregoing description, it is seen that the present invention provides an extremely efficient and reliable manner of restraining both seat and cargo pallets.

Although a particular embodiment of the invention has been illustrated and described, various changes may be made in the form, construction, and arrangement of the part without sacrificing any of its advantages, and it is to be understood that all matter herein is to be interpreted as illustrative and not in any limited sense and it is intended to cover in the appended claims such modifications and changes as come within the true spirit and scope of the invention.

I claim:

1. A cargo pallet and seat pallet restraining system for use with a moving vehicle, such as an airplane, having a floor structure; said pallet restraining system comprising:
   a rail connected to the vehicle floor strucure and disposed beneath a roller plane, said rail including:
      rail interlocking means for engaging a seal pallet latch assembly;
   roller means connected to said rail and defining a roller plane above the floor structure for rollingly supporting a pallet on said roller plane;
   a seat pallet including:
      a top side defining a top plane;
      a bottom side supported on said roller plane by said roller means; and
      a latch assembly including:
         pivoting jaw means having a rotational axis parallel to said rail and being selectively movable from a stowed position to an engaged position wherein said pivoting jaw means engages said rail interlocking means and restrains said seal pallet from movement relative to said rail; and carbo pallet restraining means for restrianing a cargo pallet supported on said roller plane; said cargo pallet restraining means connected to said rail and having a stowed position beneath said roller plane; said cargo pallet restraining means including:
lock head means including:
a first lock head movable between a stowed position beneath said roller plane and an erect position wherein a portion of said lock head extends above said roller plane for restraining a first cargo pallet on said roller plane.

2. The pallet restraining system of claim 1 wherein:
said seat pallet latch assembly is movable between a stowed position above said roller plane to an engaged positon beneath said pallet top plane.

3. The pallet restraining system of claim 1 wherein:
said rail interlock means includes:
left and right engaging means; and
said pallet latch assembly pivoting jaw means includes:
left and right pivoting jaws rotatable from a stowed position to an engaged position wherein a portion of said jaw projects under, fore and aft, and left and right of said rail left and right engaging means for restraining said seat pallet from all movement relative to said rail.

4. The pallet restraining system of claim 3 wherein:
said left and right pivoting jaws include:
a right jaw including:
rail engaging means;
said right jaw rotatable from a stowed position wherein said right jaw rail engaging means does not engage sair rail right engaging means, to an engaged position wherein said right jaw rail engaging means engages said rail right engaging means such that said pallet is restrained from movement vertically, leftward, and along said rail; and
a left jaw including:
rail engaging means;
said left jaw rotatable from a stowed position wherein said left jaw rail engaging means does not engage said rail left engaging means, to an engaged position wherein said left jaw rail engaging means engages said rail left engaging means such that said pallet is restrained from movement vertically, rightward, and along said rail.

5. The pallet restraining system of claim 3 further including:
jaw interconnection means for interconnecting said left and said right jaws such that said jaws operate simultaneously.

6. The pallet restraining system of claim 1 wherein:
said rail interlock means comprises:
a plurality of left facing rail teeth disposed along the length of said rail; and
a plurality of right facing rail teeth disposed along the length of said rail; and said latch assembly includes:
a pair of interconnected, simultaneously rotating jaws including
a right jaw including:
a left facing cavity;
said right jaw rotatable from a stowed position wherein said left facing cavity is not engaged with said right facing rail teeth to an engaged position wherein said left facing cavity is engaged with said right facing rail teeth such that said pallet is restrained from movement vertically, leftward, and along said rail; and a left jaw including:
a right facing cavity;
said left side jaw rotatable from a stowed position wherein said right facing cavity is not engaged with said left facing rail teeth to an engaged position wherein said right facing cavity is engaged with said left facing rail teeth such that said pallet is restrained from movement vertically, rightward, and along said rail.

7. The pallet restraining system of claim 6 wherein said latch assembly includes:
jaw activation means, accessible from the top side of said pallet, for moving said jaws between the stowed and engaged positions.

8. A cargo pallet and seat pallet restraining system for use with a moving vehicle, such as an airplane, having a floor structure; said pallet restraining system comprising:
a rail connected to the vehicle floor structure and disposed beneath a roller plane; said rail including:
rail interlock means for engaging a seat pallet latch assembly;
roller means connected to said rail and defining a roller plane above the floor structure for rollingly supporting a pallet on said roller plane;
a seat pallet including:
a top side defining a top plane;
a bottom side supported on said roller plane by said roller means; and
a latch assembly selectively movable from a stowed position to an engaged position wherein it engages said rail interlock means and restrains said seal pallet from movement relative to said rail; and
cargo pallet restraining means for restraining a cargo pallet supported on said roller plane; said cargo pallet restraining means connected to said rail and having a stowed position beneath said roller plane; said cargo pallet restraining means including:
lock head means including:
a first lock head movable between a stowed position beneath said roller plane and an erect position wherein a portion of said lock head extends above said roller plane for restraining a first cargo pallet on said roller plane; and
wherein said cargo pallet restraining means further comprises:
a housing connected to said rail and disposed under said roller plane; said housing including:
channel means; and wherein said first lock head includes:
a top end including:
lip means for extending over a portion of a first pallet to be secured on said roller plane; and
a bottom end including:
a rigid connecting post connected to said first lock head top end; and
pivoting securing means for pivotally securing said first lock head bottom end to said housing;
said first lock head selectively pivotable about said pivoting securing means from a stowed position under said roller plane to an erect position wherein said first lock head top end extends above said roller pane such that said first lock head lip means will extend over a portion of a first pallet on said roller plane; and
wherein said lock head means further includes:

a second lock head including:
  a top end including:
    lip means for extending over a portion of a second pallet adjacent the first pallet to be secured on said roller plane;
  a bottom end including:
    a rigid connecting post connected to said second lock head top end; and
    sliding and pivoting securing means for slidingly and pivotally securing said second lock head bottom end to said housing channel means;
  said second lock head selectively slidable and rotatable from a stowed position under said roller plane to an erect position wherein said second lock head top end extends above said roller plane such that said second lock head lip means will extend over a portion of a second pallet on said roller plane adjacent the first pallet; and
wherein said cargo pallet restraining system further includes:
  means for retaining said lock head in an erect position including:
    interlocking means between said first lock head bottom end and said second lock head bottom end preventing said first lock head from rotation.

9. The pallet restraining system of claim 8 wherein said interlocking means includes:
  a locking projection on one said lock head bottom end; and
  a receiving slot for said locking projection on the other said lock head bottom end.

10. A cargo pallet and seat pallet restraining system for use with a moving vehicle, such as an airplane, having a floor structure; said pallet restraining system comprising:
  a rail connected to the vehicle floor structure and disposed beneath a roller plane; said rail including:
    rail interlock means for engaging a seat pallet latch assembly;
  roller means connected to said rail and defining a roller plane above the floor structure for rollingly supporting a pallet on said roller plane;
  a seat pallet including:
    a top side defining a top plane;
    a bottom side supported on said roller plane by said roller means; and
    a latch assembly selectively movable from a stowed position to an engaged position wherein it engages said rail interlock means and restrains said seat pallet from movement relative to said rail; and
  cargo pallet restraining means for restraining a cargo pallet supported on said roller plane; said cargo pallet restraining means connected to said rail and having a stowed position beneath said roller plane; said cargo pallet restraining means including:
  lock head means including:
    a first lock head movable between a stowed position beneath said roller plane and an erect position wherein a portion of said lock head extends above said roller plane for restraining a first cargo pallet on said roller plane; and
  wherein said cargo pallet restraining means further comprises:
    a housing connected to said rail and disposed under said roller plane; said housing including:
      channel means; and wherein said first lock head includes:
        a top end including:
          lip means for extending over a portion of a first pallet to be secured on said roller plane; and
        a bottom end including:
          a rigid connecting post connected to said first lock head top end; and
          pivoting securing means for pivotally securing said first lock head bottom end to said housing; said first lock head selectively pivotable about said pivoting securing means from a stowed position under said roller plane to an erect position wherein said first lock head top and extends above said roller plane such that said first lock head lip means will extend over a portion of a first pallet on said roller plane; and
  wherein said lock head means further includes:
    a second lock head including:
      a top end including:
        lip means for extending over a portion of a second pallet adjacent the first pallet to be secured on said roller plane;
      a bottom end including:
        a rigid connecting post connected to said second lock head top end; and
        sliding and pivoting securing means for slidingly and pivotally securing said second lock head bottom end to said housing channel means;
    said second lock head selectively slidable and rotatable from a stowed position under said roller plane to an erect position wherein said second lock head top end extends above said roller plane such that said second lock head lip means will extend over a portion of a second pallet on said roller plane adjacent the first pallet; and further including:
  erection biasing means for biasing said first locking head toward the erect position.

11. The pallet restraining system of claim 10 further including:
  stowing biasing means for biasing said lock heads in the stowed position when said lock head are in the stowed position.

12. A cargo pallet and seat pallet restraining system for use with a moving vehicle, such as an airplane, having a floor structure; said pallet restraining system comprising:
  a rail connected to the vehicle floor structure and disposed beneath a roller plane; said rail including:
    rail interlock means for engaging a seat pallet latch assembly;
  roller means connected to said rail and defining a roller plane above the floor structure for rollingly supporting a pallet on said roller plane;
  a seat pallet including:
    a top side defining a top plane;
    a bottom side supported on said roller plane by said roller means; and
    a latch assembly selectively movable from a stowed position to an engaged position wherein it engages said rail interlock means and restrains said seat pallet from movement relative to said rail; and
  cargo pallet restraining means for restraining a cargo pallet supported on said roller plane; said cargo pallet restraining means connected to said rail and having a stowed position beneath said roller plane; said cargo pallet restraining means including:
a plurality of lock head means, in pairs with each pair member being immediately on the opposite side of said rail from its paired member, each lock head means including:
a first lock head movable between a stowed position beneath said roller plane and an erect position wherein a portion of said first lock head extends above said roller plane for restraining a first cargo pallet on said roller plane; and wherein said cargo pallet restraining means further includes:
tying means connecting said first lock head on one side of said rail to its said paired first lock head on the other side of said rail such that erection of either said first lock head erects the other.

13. A cargo pallet and seat pallet restraining system for use with a moving vehicle, such as an airplane, having a floor structure; said pallet restraining system comprising:
a rail connected to the vehicle floor structure and disposed beneath a roller plane; said rail including:
rail interlock means for engaging a seat pallet latch assembly;
roller means connected to said rail and defining a roller plane above the floor structure for rollingly supporting a pallet on said roller plane;
a seat pallet including:
a top side defining a top plane;
a bottom side supported on said roller plane by said roller means; and
a latch assembly selectively movable from a stowed position to an engaged position wherein it engages said rail interlock means and restrains said seat pallet from movement relative to said rail; and
cargo pallet restraining means for restraining a cargo pallet supported on said roller plane; said cargo pallet restraining means connected to said rail and having a stowed position beneath said roller plane; said cargo pallet restraining means including:
a plurality of lock head means, in pairs with each pair member being immediately on the opposite side of said rail from its paired member, each lock head means including:
a first lock head movable between a stowed position beneath said roller plane and an erect position wherein a portion of said first lock head extends above said roller plane for restraining a first cargo pallet on said roller plane; and wherein each said lock head means further includes:
a second lock head movable between a stowed position beneath said roller plane and an erect position wherein a portion of said second lock head extends above said roller plane for restraining a second cargo pallet on said roller plane.

14. The pallet restraining system of claim 13 wherein said cargo pallet restraining means further includes:
tying means connecting a first said lock head means to its said pair member on the other side of said rail such that erection of a lock head of said first lock head means erects a lock head of said pair member.

15. A cargo pallet and seat pallet restraining system for use with a moving vehicle, such as an airplane, having a floor structure; said pallet restraining system comprising:
a rail connected to the vehicle floor structure and disposed beneath a roller plane; said rail including:
rail interlock means for engaging a seat pallet latch assembly;
roller means connected to said rail and defining a roller plane above the floor structure for rollingly supporting a pallet on said roller plane;
a seat pallet including:
a top side defining a top plane;
a bottom side supported on said roller plane by said roller means; and
a latch assembly selectively movable from a stowed position to an engaged position wherein it engages said rail interlock means and restrains said seat pallet from movement relative to said rail; and
cargo pallet restraining means for restraining a cargo pallet supported on said roller plane; said cargo pallet restraining means connected to said rail and having a stowed position beneath said roller plane; said cargo pallet restraining means including:
a plurality of lock head means, in pairs with each pair member being immediately on the opposite side of said rail from its paired member, each lock head means including:
a first lock head movable between a stowed position beneath said roller plane and an erect position wherein a portion of said first lock head extends above said roller plane for restraining a first cargo pallet on said roller plane; and wherein each said lock head means further comprises:
a housing connected to said rail and disposed under said roller plane; said housing including: channel means; and
wherein said lock head means includes:
a first lock head including:
a top end including:
lip means for extending over a portion of a first pallet to be secured on said roller plane; and
a bottom end including:
a rigid connecting post connected to said first lock head top end; and
pivoting securing means for pivotally securing said first lock head bottom end to said housing; said first lock head selectively pivotable about said pivoting securing means from a stowed position under said roller plane to an erect position wherein said first lock head top end extends above said roller plane such that said first lock head lip means will extend over a portion of a first pallet on said roller plane; and
a second lock head including:
a top end including:
lip means for extending over a portion of a second pallet adjacent the first pallet to be secured on said roller plane;
a bottom end including:
a rigid connecting post connected to second lock head top end; and
sliding and pivoting securing means for slidingly and pivotally securing said second lock head bottom end to said housing channel means; said second lock head selectively slidable and rotatable from a stowed position under said roller plane to an erect position wherein said second lock head top end extends above said roller plane such that said second lock head lip means will extend over a portion of a second pallet on said roller plane adjacent the first pallet.

16. The pallet restraining system of claim 15 wherein said lock head means further includes:
pivot tie link means pivotally connecting said first lock head top end and said second lock head top end such that movement of either said lock head to the erected or stowed position simultaneously moves said other lock head to the similar position.

17. A cargo pallet and seat pallet restraining system for use with a moving vehicle, such as an airplane, having a floor structure including an elongate floor channel attached to the vehicle floor structure of the type having a plurality of axial spaced lip means on said floor channel for periodically narrowing said floor channel;
an elongate rail held in the vehicle floor channel and disposed beneath a roller plane; said rail including:
an upper portion including:
rail interlock means;
a bottom including:
button means on said rail bottom for placement in said floor channel such that after placement said rail can be moved axially such that said button means is under a said lip mans such that said rail cannot be removed vertically from said floor channel; and
rail retainer means for selectively preventing a said rail in said floor channel from axial movement;
roller means connected to said rail and defining a roller plane above the floor structure for rollingly supporting a pallet on said roller plane;
a seat pallet including:
a top side defining a top plane;
a bottom side supported on said roller plane by said roller means; and
a latch assembly selectively movable from a stowed position to an engaged position wherein it engages said rail interlock means and restrains said seat pallet from movement relative to said rail; and
cargo pallet restraining means for restraining a cargo pallet supported on said roller plane; said cargo pallet restraining means connected to said rail and having a stowed position beneath said roller plane; said cargo pallet restraining means including:
lock head means including:
a first lock head movable between a stowed position beneath said roller plane and an erect position wherein a portion of said first lock head extends above said roller plane for restraining a cargo pallet on said roller plane; and wherein said rail is comprised of a plurality of rail segments; and wherein said rail further includes:
a spacer segment between two rail segments; said spacer segment not being attached to said floor channel; said spacer rail segment removably attached to an adjacent rail segment and removable from said rail upon detachment from said adjacent rail segment, said spacer segment of sufficient width such that removal of said spacer segment provides an adjacent rail segment with sufficient axial movement space for removal from said floor channel.

18. The pallet restraining system of claim 17 wherein said rail retainer means includes:
a retainer removably attachable to said rail including:
partial-button means for insertion into said floor channel and retained at lip level between adjacent axial lips; such that said lips prevent axial movement of said partial button means.

19. A cargo pallet and seat pallet restraining system for use with a moving vehicle, such as an airplane, having a floor structure; said pallet restraining system comprising:
an elongate floor channel attached to the vehicle floor structure;
roller means attached to a seat pallet restraining means rail; said roller means defining a roller plane above the floor structure for rollingly supporting pallets on said roller plane; and
seat pallet restraining means comprising:
an elongate rail attached to said vehicle floor channel such that said rail is disposed beneath said roller plane; said rail including:
an upper portion including:
rail interlock means;
a bottom; and
rail attachment means for removable attaching said rail to said floor channel;
a seat pallet including:
a top side;
a bottom side supported on said roller plane by said roller means; and
a latch assembly for selective engagement with said rail interlock means for restraining said seat pallet from movement relative to said rail; and
cargo pallet restraining means for restraining a cargo pallet supported on said roller plane; said cargo pallet restraining means connected to said rail and having a stowed position beneath said roller plane; said cargo pallet restraining means including:
lock head means including:
a first lock head movable between a stowed position beneath said roller plane and an erect position wherein a portion of sad first lock head extends above said roller plane for restraining a cargo pallet on said roller plane; and wherein said rail is comprised of a plurality of rail segments; and wherein said rail further includes a spacer segment between two rail segments; said spacer segment not attached to said floor channel; said spacer rail segment removably attached to an adjacent rail segment and removable from said rail upon detachment from said adjacent rail segment, said spacer segment of sufficient width such that removal of said spacer segment provides an adjacent rail segment with sufficient axial movement space for removal.

20. The pallet restraining system of claim 19 wherein said cargo pallet restraining means includes:
housing means connected to said rail and disposed under said roller plane; and
said lock head means includes:
a fore lock head including:
a top end including:
fore lip means for extending fore over a portion of a first pallet to be secured on said roller plane; and a bottom end including:
  a rigid connecting post connected to said fore lock head top end; and
  pivoting securing means for pivotally securing said fore lock head bottom end to said housing means;
said fore lock head selectively pivotable about said pivoting securing means from a stowed position under said roller plane to an erect position wherein said fore lock head top end extends above said roller plane such that said fore lock head lip means will extend forward over a portion of a pallet on said roller plane;
an aft lock head including:
  a top end including:
    aft lip means for extending aft over a portion of a pallet on said roller plane;
  a bottom end including:
    a rigid connecting post connected to said aft lock head top end; and
    sliding and pivoting securing means for slidingly and pivotally securing said second lock head bottom end to said housing means; said second lock head selectively slidable and rotatable from a stowed position under said roller plane to an erect position wherein said second lock head top end extends above said roller plane such that said second lock head lip means will extend over a portion of a second pallet on said roller plane adjacent the first pallet.

21. The pallet restraining system of claim 19 wherein:
said floor channel includes:
  a top entry portion; and
  a plurality of axial spaced lip means for periodically narrowing said top entry portion; and
said rail attaching means includes:
  button means on said rail bottom for placement in said floor channel such that after placement said rail can be moved axially such that said button means is under a said lip means such that said rail cannot be removed vertically from said floor channel; and
  rail retainer means for selectively preventing said rail in said floor channel from axial movement.

22. A cargo pallet and seat pallet restraining system for use with a moving vehicle, such as an airplane, having a floor structure; said pallet restraining system comprising:
  a rail connected to the vehicle floor structure and disposed beneath a roller plane; said rail including:
    rail interlock means for engaging a seat pallet latch assembly;
  roller means connected to said rail and defining a roller plane above the floor structure for rollingly supporting a pallet on said roller plane;
  a seat pallet including:
    a top side defining a top plane;
    a bottom side supported on said roller plane by said roller means; and
    a latch assembly selectively movable from a stowed position to an engaged position where it engages said rail interlock means and restrains said seat pallet from movement relative to said rail; and
  cargo pallet restraining means for restraining a cargo pallet supported on said roller plane; said cargo pallet restraining means connected to said rail and having a stowed position beneath said roller plane; said cargo pallet restraining means including:
    lock head means including:
      a first lock head movable between a stowed position beneath said roller plane and an erect position wherein a portion of said lock head extends above said roller plane for restraining a first cargo pallet on said roller plane; and
    a housing connected to said rail and disposed under said roller plane; said housing including:
      channel means; and wherein said first lock head includes:
        a top end including:
          lip means for extending over a portion of a first pallet to be secured on said roller plane; and
        a bottom end including:
          a rigid connecting post connected to said first lock head top end; and
          pivoting securing means for pivotally securing said first lock head bottom end to said housing; said first lock head selectively pivotable about said pivoting securing means from a stowed position under said roller plane to an erect position wherein said first lock head top and extends above said roller plane such that said first lock head lip means will extend over a portion of a first pallet on said roller plane; and
      wherein said lock head means further includes:
        a second lock head including:
          a top end including:
            lip means for extending over a portion of a second pallet adjacent the first pallet to be secured on said roller plane;
          a bottom end including:
            a rigid connecting post connected to said second lock head top end; and
            sliding and pivoting securing means for slidingly and pivotally securing said second lock head bottom end to said housing channel means;
        said second lock head selectively slidable and rotatable from a stowed position under said roller plane to an erect position wherein said second lock head to pend extends above said roller plane such that said second lock head lip means will extend over a portion of a second pallet on said roller plane adjacent the first pallet; and wherein;
        said first and second lock head top ends include interlocking gearing that is always engaged; and wherein;
      said cargo pallet restraining means further includes:
        pivot tie link means pivotally connecting said first lock head top end and said second lock head top end such that movement of either said lock head to the erected or stowed position simultaneously moves said other lock head to the similar position.

* * * * *